(12) United States Patent
Iannello et al.

(10) Patent No.: US 7,005,864 B2
(45) Date of Patent: Feb. 28, 2006

(54) CAPACITIVE POSITION SENSING SYSTEM WITH RESONANT AMPLIFICATION

(75) Inventors: Victor Iannello, Roanoke, VA (US); Robert Jett Field, Fincastle, VA (US)

(73) Assignee: Synchrony, Inc., Roanoke, VA (US)

( * ) Notice: Subject to any disclaimer, the term of this patent is extended or adjusted under 35 U.S.C. 154(b) by 54 days.

(21) Appl. No.: 10/277,008

(22) Filed: Oct. 21, 2002

(65) Prior Publication Data

US 2004/0075442 A1    Apr. 22, 2004

(51) Int. Cl.
*G01R 27/04*    (2006.01)
*G01R 27/32*    (2006.01)

(52) U.S. Cl. .................... 324/632; 324/658
(58) Field of Classification Search ............ 324/658, 324/659, 661, 662, 681, 682, 686, 687, 688
See application file for complete search history.

(56) References Cited

U.S. PATENT DOCUMENTS 5,434,427 A * 7/1995 Crane et al. .............. 250/556

5,757,196 A * 5/1998 Wetzel .................... 327/688

OTHER PUBLICATIONS

Baxter, Larry K., *Capacitive Sensors: Design and Applications*, Dec. 1997, IEEE.

* cited by examiner

*Primary Examiner*—Anjan Deb
*Assistant Examiner*—John Teresinski
(74) *Attorney, Agent, or Firm*—Michael Haynes PLC

(57) ABSTRACT

At least one exemplary embodiment of the present invention includes a capacitive sensing system, comprising a sensing conductor coupleable to a grounded target by a gap capacitance $C_d$, said grounded target separated from said sensing conductor by a gap having a width. The capacitive sensing system also comprises a circuit connected to said sensing conductor, an input signal having an input frequency $f_{osc}$ provided to said circuit through an input resistance $R_d$, an output signal of said circuit having an output voltage varying linearly with the width of the gap when the impedance of the gap capacitance $1/(2\pi f_{osc} C_d)$ approaches or exceeds the input resistance $R_d$.

19 Claims, 7 Drawing Sheets

CAPACITIVE POSITION SENSING SYSTEM WITH RESONANT AMPLIFICATION

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

At least one exemplary embodiment of the present invention includes a capacitive position sensing system that comprises a sensing conductor coupleable to a grounded target by a gap capacitance $C_d$, said grounded target separated from said sensing conductor by a gap having a width. The capacitive sensing system also comprises a circuit connected to said sensing conductor, an input signal having an input frequency $f_{osc}$ provided to said circuit through an input resistance $R_d$, an output signal of said circuit having an output voltage varying linearly with the width of the gap when the impedance of the gap capacitance $1/(2\pi f_{osc} C_d)$ approaches or exceeds the input resistance $R_d$.

At least one exemplary embodiment of the present invention includes a system that comprises a delay element connected to an op-amp, said delay element comprising a stray capacitance $C_s$ between a guard conductor and a sensing conductor. The delay element also comprises a stray capacitance $C_c$ between the guard conductor and a grounded shield, an input resistance $R_d$ connected serially between an oscillating voltage input and said op-amp, and a variable resistance $R_c$ connected in series between an output of said op-amp and the guard conductor. A resonant frequency of said system is approximately equal to a frequency $f_{osc}$ of the oscillating voltage input.

At least one exemplary embodiment of the present invention includes a method that comprises providing an oscillating signal to a system comprising a delay element serially connected to an input of an op-amp, the delay element comprising a stray capacitance between a guard conductor and a sensing conductor, and a variable resistor. The method also comprises adjusting a resistance of the variable resistor such that a resonant frequency resulting from the delay element approximately equals a frequency of the provided oscillating signal.

Figure 1:
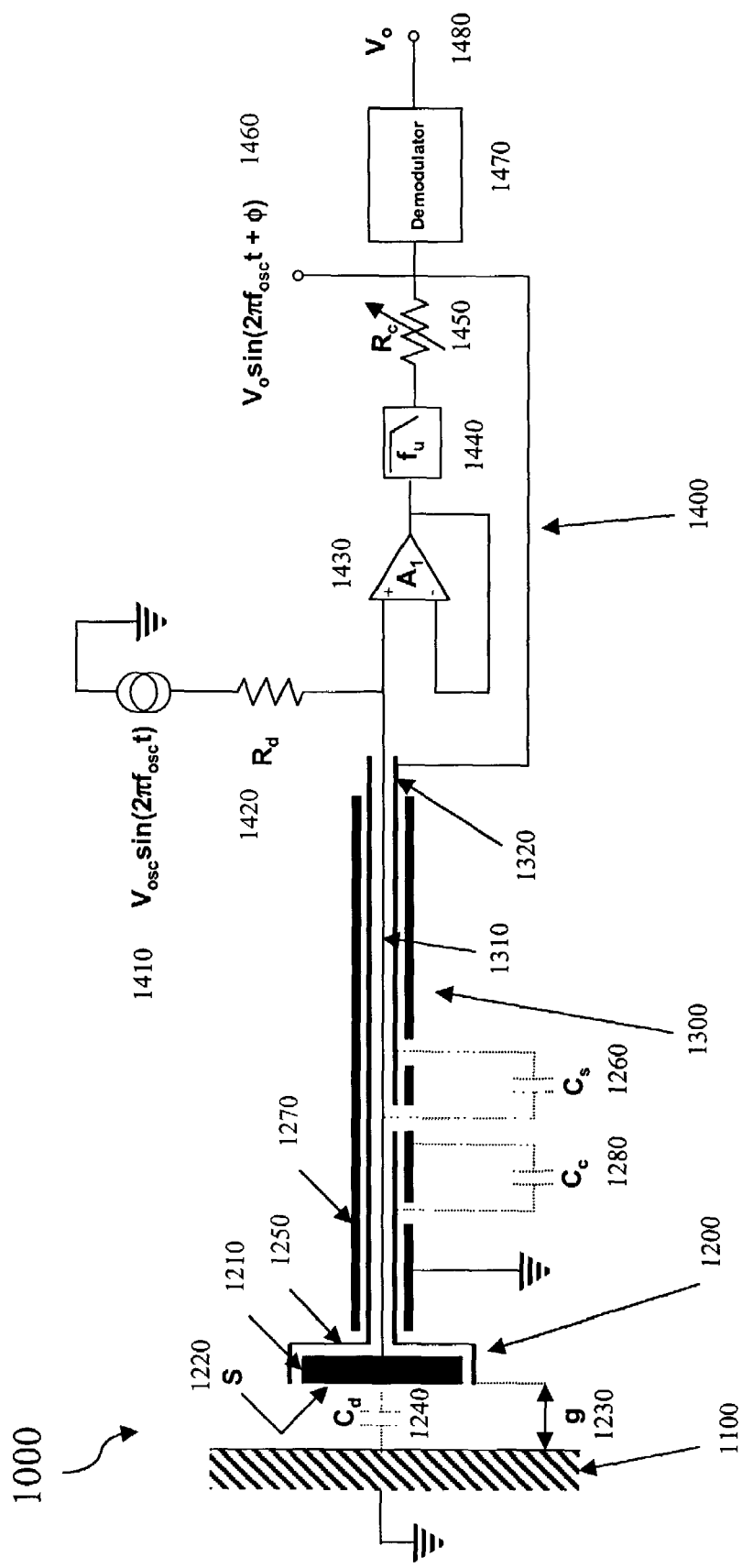
FIG. 1 is an electrical diagram of an exemplary embodiment of a system 1000 of the present invention.

FIG. 1 is an electrical diagram of an exemplary embodiment of a capacitive sensing system 1000 of the present invention. A grounded target 1100 can be sensed by as few as one sensor 1200, which is connected via a cable 1300 to sensor electronics 1400. When sensor 1100, which can comprise as few as one sensing electrode 1210 surrounded by a guard 1250, is placed in proximity of grounded target 1100, the sensing electrode 1210 can be capacitively coupled to the target 1100 (and hence ground) by an effective gap capacitance 1240 given by:

$$C_d = \epsilon_o S/g \tag{1}$$

where $\epsilon_o$ is the permittivity of free space, S is the effective surface area 1220 of the electrode, and g is the gap 1230 between the sensor electrode 1210 and the target 1100.

By designing a suitable circuit 1400 whose output voltage 1480 varies inversely with gap capacitance 1240 ($C_d$), the gap 1230 can be measured. The circuitry 1400 can be connected to the sensor 1200 through a cable 1300, which can be up to several meters or more in length. At the sensor end of the cable 1300, the center conductor 1310 of the cable 1300 can be connected to the sensing electrode 1210. The guard electrode 1250 can surround the center conductor 1310 and the sensing electrode 1210. A grounded shield 1270 can surround the guard 1250.

The center conductor 1310 can be coupled to the guard conductor 1250 through an effective stray capacitance 1260 ($C_s$), and the guard conductor 1250 in turn can be coupled to the grounded shield 1270 through an effective stray capacitance 1280 ($C_c$).

A signal source 1410, such as an oscillator, providing a sinusoidal signal of amplitude $V_{osc}$ and frequency $f_{osc}$, can be fed to the cable 1300 through a resistor 1420 ($R_d$) of high impedance. The resistor 1420 ($R_d$) and gap capacitance 1240 ($C_d$) form a voltage divider network, and this voltage can be fed to the non-inverting input of an op-amp 1430 ($A_1$), which can serve as a buffer by connecting its output and inverting input terminals.

The actual performance of the op-amp 1430 ($A_1$) is represented as an ideal op-amp (with infinite open-loop bandwidth and gain) in series with a first-order lag network 1440 with bandwidth ($f_u$), where $f_u$ is the unity gain bandwidth of the op-amp. Variable resistor 1450 ($R_c$) is in series with the actual op-amp 1430.

As the gap 1230 (g) between the sensor 1210 and target 1100 is varied, the amplitude ($V_o$) of the sinusoidal output signal 1460 also can vary. This sinusoidal voltage signal then can be demodulated via demodulator 1470 and subsequently filtered (not shown) using standard techniques so that the output level 1480 of the circuit is proportional to the amplitude $V_o$, and is a DC voltage if the gap is not varying with time.

If the first-order lag network 1440 and variable resistor ($R_c$) are absent, the relationship between the output and oscillator amplitudes can be described by the following equation:

$$V_o/V_{osc} = \sqrt{\frac{1}{1+(2\pi R_d C_d f_{osc})^2}} \tag{2}$$

In some situations, it can be desirable for the output voltage $V_o$ to vary linearly with gap g. Using Equations (1) and (2), however, this occurs only if the product $2\pi R_d C_d f_{osc} \gg 1$. Yet when the first-order lag network 1440 and variable resistor ($R_c$) are absent, this in general is not the case. For instance, as the gap 1230 (g) increases, $C_d$ becomes small, and a gap will be reached for which this relationship is no longer satisfied. As a result, when the first-order lag network 1440 and variable resistor ($R_c$) are absent, the useful range of the capacitive sensing system can be limited.

One function of the guard conductor is to minimize the effect of the stray capacitance between the center conductor and ground. If the guard conductor were absent, any such stray capacitance would appear electrically in parallel to the gap capacitance $C_d$, and would therefore cause a reduction in sensitivity and linearity of the output $V_o$ relative to the gap. To minimize the effect of this stray capacitance, the guard conductor can be driven by the output of the buffer so that its electrical potential is very nearly the same as the center conductor and sensing electrode. As such, essentially no stray currents between them will flow, and the stray capacitance is effectively nulled.

It has been discovered that when the first-order lag network 1440 and variable resistor ($R_c$) are absent, capacitive sensing system 1000 can suffer from the following limitations:

1. To achieve a linear relationship between the voltage $V_o$ and the gap g, the product $2\pi f_{osc} R_d C_d$ must be much greater than unity. For larger gaps in which gap capacitance $C_d$ becomes small, linearity may be achieved by:
   increasing the area S of the sensing electrode, which can increase the overall size and cost of the sensor;
   increasing the operating frequency $f_{osc}$, which can increase the complexity, power requirements, and cost of the electrical circuitry;
   increasing the series resister $R_d$, which can degrade the performance by increasing the electrical noise and reducing the gain;
   replacing the sinusoidal voltage source $V_{osc}$ with a precisely controlled sinusoidal current source, which can increase the complexity and cost of the electrical circuitry;
2. The finite bandwidth of op-amp $A_1$ can reduce the effective nulling of the stray capacitance, thereby reducing the sensitivity and linearity;
3. The finite bandwidth of the op-amp $A_1$ can produce a small lag in output that when introduced to the non-inverting terminal through the guard stray capacitance $C_s$, can result in a second-order attenuation of the output that limits the operating frequency well below the unity gain bandwidth of the op-amp;
4. Stray capacitance between the non-inverting input terminal of op-amp $A_1$ and its power input terminals can reduce the sensitivity and linearity;
5. There can be additional stray capacitance such as the fringing of the electric field at the sensing electrode that can reduce the sensitivity and linearity.

Figure 2:
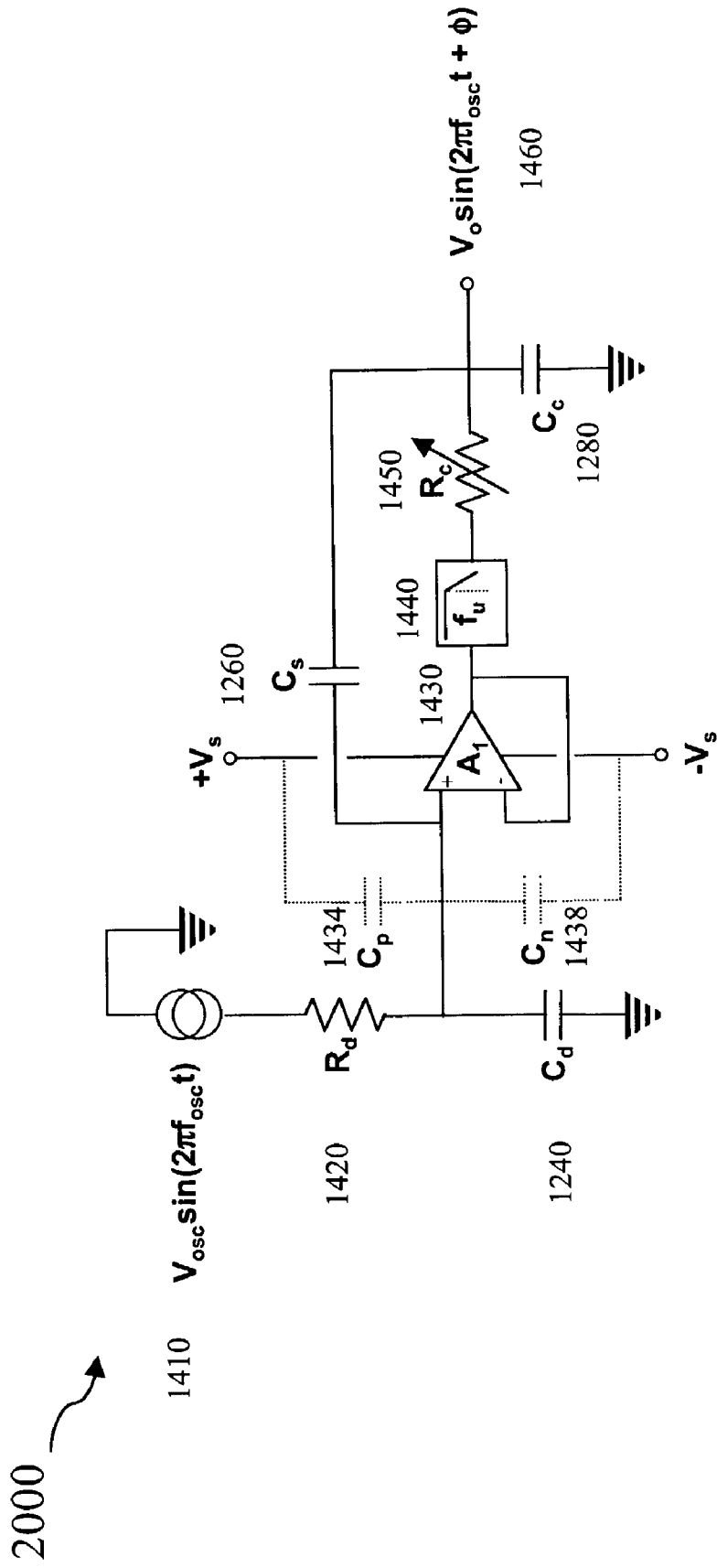
FIG. 2 is an electrical diagram of an exemplary embodiment of a system 2000 of the present invention.

FIG. 2 is an electrical diagram of an exemplary embodiment of a system 2000 of the present invention. In this figure, gap capacitance ($C_d$) and the stray capacitances 1280 ($C_c$) and 1260 ($C_s$) depicted in FIG. 1 are shown as discrete components. Also, variable resistor 1450 ($R_c$), in combination with the guard-to-shield stray capacitance 1260 ($C_c$), are shown to form a first-order lag network which can function as an adjustable delay element, in cascade with the delay of the op-amp 1440.

When the output of the adjustable delay element is fed-back to the non-inverting input of the op-amp 1430 through the guard stray capacitance 1260 ($C_s$), system 2000 forms a resonant circuit. As such, when the frequency $f_{osc}$ of the oscillator 1410 is varied over a range, the circuit output amplitude $V_o$ is amplified until the natural frequency $f_n$ is reached, and further increases in frequency result in attenuation of the output. This amplification due to resonance tends to compensate for the non-linearity that is exhibited without the variable resistor 1450 when the impedance of the gap capacitance $C_d$ approaches the impedance of the resistor $R_d$.

An analysis of the circuit, results presented below, shows that when the oscillator frequency $f_{osc}$ is chosen to be equal to the natural frequency $f_n$ of the circuit, the non-linearity is exactly cancelled, and the output amplitude $V_o$ varies linearly with gap 1230 (g). This is true even when the value of the impedance of the gap capacitance 1240 ($C_d$) approaches the value of the impedance of the input resistance 1420 ($R_d$).

The following observations and assumptions simplify the analysis of this circuit:

The unity gain bandwidth of the op-amp $f_u$ and the bandwidth of the low pass network ($\frac{1}{2}\pi R_c C_c$) are much greater than the operating frequency $f_{osc}$ so that the delays of the op-amp and the low pass network add, yielding an effective bandwidth $f_s$ of the cascaded networks given by:

$$f_s = [1/f_u + 2\pi R_c C_c]^{-1} \qquad (3)$$

The stray capacitances $C_s$ and $C_c$ are much greater than the sensor capacitance $C_d$.

When the guard conductor is driven by op-amp $A_1$, the phase-shifted signal appears at the non-inverting input of the op-amp through the stray capacitance $C_s$. It can be shown that this causes the circuit to behave as a damped, resonant circuit whose natural or resonant frequency $f_n$ is given by:

$$f_n = \left[\frac{f_s}{2\pi R_d C_s}\right]^{1/2} \qquad (4)$$

It can also be shown the damping ratio of this resonant system is given by $$\zeta = \frac{C_d}{2}\left[\frac{2\pi R_d f_s}{C_s}\right]^{1/2} \qquad (5)$$

For optimum performance, the variable resistor $R_c$ can be adjusted such that the natural frequency $f_n$ is approximately equal to the oscillator frequency $f_{osc}$. In one exemplary embodiment, $f_n = f_{osc} = 125$ kHz. When the two frequencies essentially match, the amplitude of the output signal $V_o$ is related to that of the oscillator voltage $V_{osc}$ by the well-known equation:

$$V_o/V_{osc} = \frac{1}{2}\zeta \qquad (6)$$

Combining equations (5) and (6) yields an equation for the output voltage as a function of sensor capacitance:

$$V_o/V_{osc} = \frac{1}{C_d}\left[\frac{C_s}{2\pi R_d f_s}\right]^{1/2} \qquad (7)$$

Equation (7) predicts that the output $V_o$ is inversely proportional to the sensor capacitance $C_d$ for the improved circuit with resonant amplification, and therefore the output voltage is linear with gap. Equation (7) can be contrasted to Equation (2), which predicts that when the first-order lag network 1440 and variable resistor ($R_c$) are absent, the output voltage amplitude $V_o$ is linear with gap only if $2\pi R_d C_d f_{osc} \gg 1$.

Thus, when the first-order lag network 1440 and variable resistor ($R_c$) are present, and particularly selected such that it causes $f_n$ to equal and/or approximately equal $f_{osc}$, the linearity and range of the circuit can be greatly improved. Moreover, the size of the sensor, power requirement, cost, and/or complexity of the sensing system can remain the same. Limitations (1) through (3) that were presented above for the system with the first-order lag network 1440 and variable resistor ($R_c$) absent can be eliminated.

Referring to FIG. 2, there is a parasitic capacitance between the non-inverting input of the op-amp and the positive and negative power inputs. The parasitic capacitances are shown as the components 1434 ($C_p$) and 1438 ($C_n$) in the schematic for the positive and negative power inputs, respectively. This parasitic capacitance is electrically in parallel with the sensor capacitance $C_d$ and therefore causes a reduction in sensitivity and linearity of the voltage output $V_o$ relative to the gap g. To minimize the effect of this parasitic capacitance, the circuit can be modified such that the power input terminals of the op-amp are at approximately the same AC potential as its non-inverting input.

Figure 3:
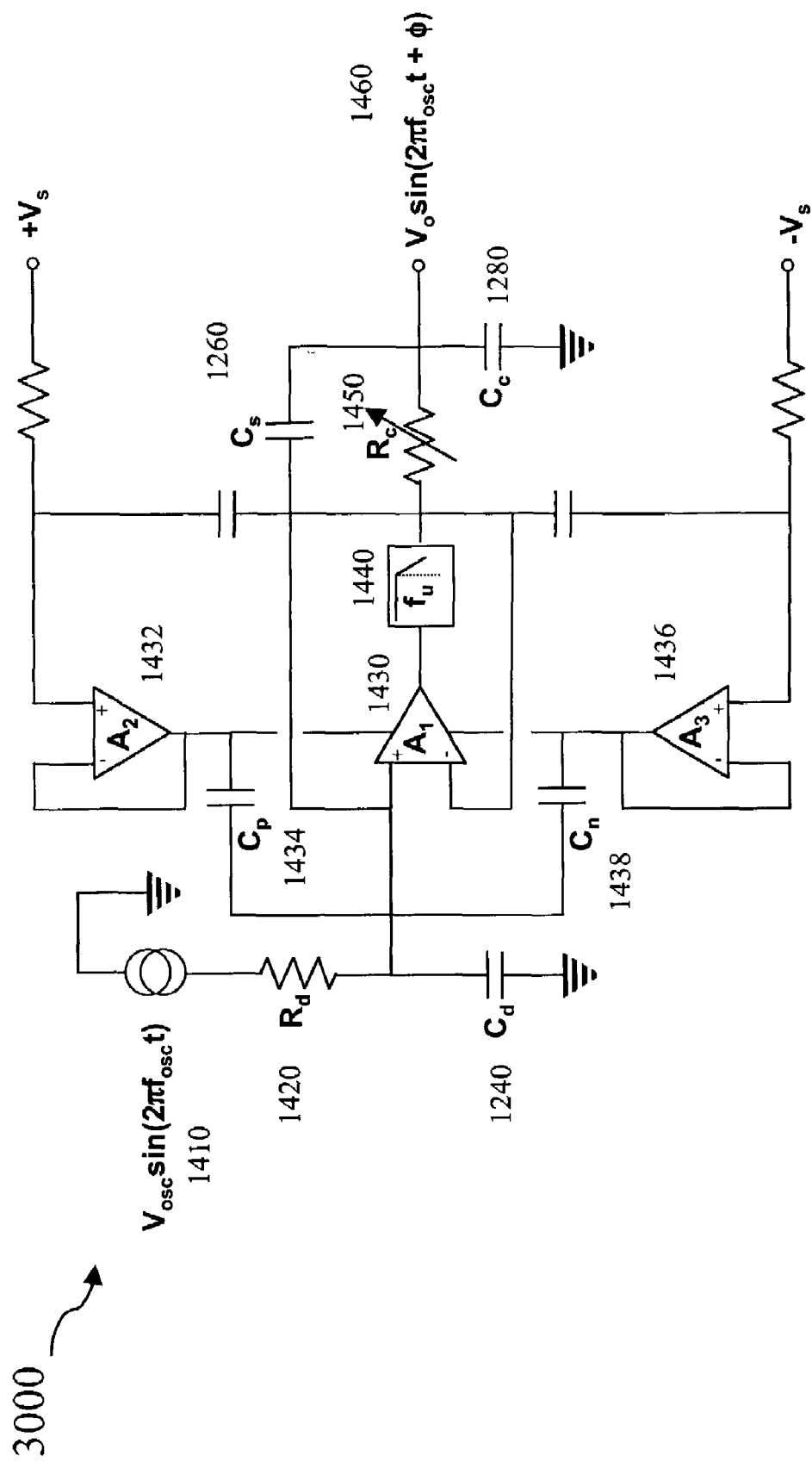
FIG. 3 is an electrical diagram of an exemplary embodiment of a system 3000 of the present invention.

FIG. 3 is an electrical diagram of an exemplary embodiment of a system 3000 of the present invention that includes this improved circuit. The parasitic capacitances are shown as the components 1434 ($C_p$) and 1438 ($C_n$) in the schematic for the positive and negative power inputs, respectively. The high frequency output of op-amp 1430 ($A_1$) is added to the positive and negative supply voltages at the input terminals of buffer amplifiers 1432 ($A_2$) and 1436 ($A_3$), respectively. The outputs of these buffers drive the power inputs to the op-amp 1430 ($A_1$). As such, the amount of parasitic current that flows through $C_p$ and $C_n$ is essentially reduced to zero. This improvement can eliminate limitation (4) presented above for the system 1000 which suffers from a reduction in linearity due to the parasitic capacitance between the non-inverting input of the op-amp and the positive and negative power inputs.

Figure 4:
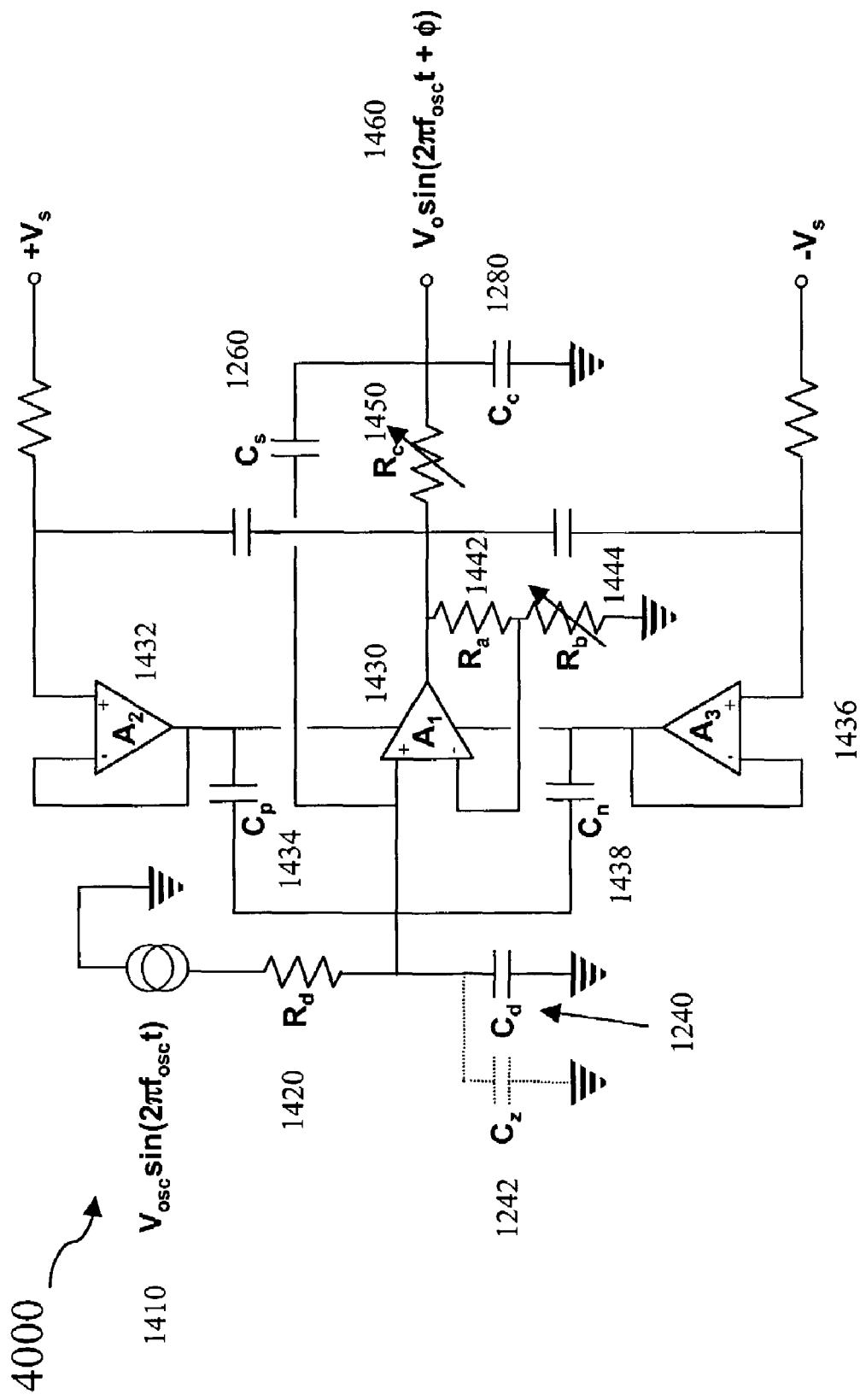
FIG. 4 is an electrical diagram of an exemplary embodiment of a system 4000 of the present invention.

Other stray capacitances can reduce the linearity of the sensing system. For instance, stray electrical fields at the sensing electrode would appear as a shunt capacitor in parallel with the sensor capacitance $C_d$. FIG. 4 is an electrical diagram of an exemplary embodiment of a system 4000 of the present invention, and includes an improved circuit that includes an adjustment for any residual stray capacitances, shown collectively as 1242 ($C_z$) in the schematic. Op-amp 1430 ($A_1$), previously operated as a unity-gain buffer, is re-configured to produce non-inverting gain, where the stage gain is given by ($1+R_a/R_b$). By making $R_b$ a variable resistor 1444, the gain of this stage can be made to vary over a range.

When the gain of the op-amp stage is greater than unity, stray current flows via the stray capacitance 1260 ($C_s$) between the sensing conductor and the guard conductor because the potential of the guard is no longer equal to that of the sensing conductor. If the stray current through $C_s$ exactly balances the stray currents flowing through the residual stray capacitance $C_z$, then the effect of the $C_z$ is nullified. This condition occurs when the gain G is chosen such that $$G-1=R_a/R_b=C_z/C_s \qquad (8)$$

For a properly designed system, $C_z << C_s$, and therefore $R_a << R_b$. As such, the gain G of the op-amp stage is typically slightly greater than unity. Because the residual capacitance $C_z$ can be difficult to measure or calculate, best performance of the circuit can be attained by experimentally adjusting $R_b$ to achieve the optimum linearity. This improvement can eliminate limitation (5) presented above for the system which suffers from a reduction in linearity and gain due to the parasitic capacitance such as fringing of the electric field at the sensing electrode.

Figure 5:
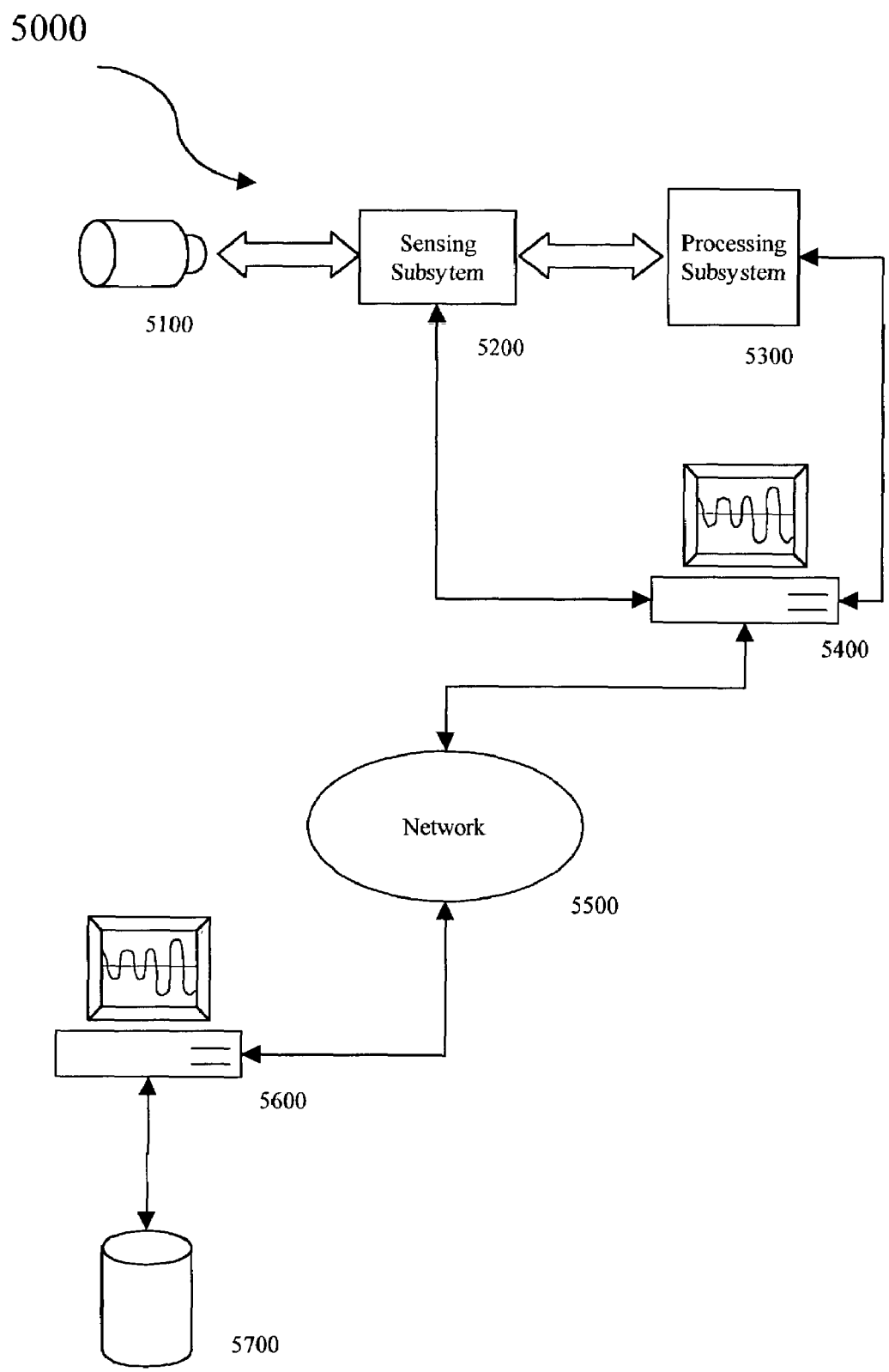
FIG. 5 is an electrical diagram of an exemplary embodiment of a system 5000 of the present invention.

In certain exemplary embodiments, typical values/part numbers for certain components of system 4000 can be as follows:

$R_d$: 1.5 M Ohm
$R_c$: 10 Ohm
$R_a$: 3.32 Ohm
$R_b$: 10 K Ohm
$A_1$: Burr Brown OPA671AP
$A_2$: Burr Brown BUF634T
$A_3$: Burr Brown BUF634T
$C_s$: 320 pF typical stray capacitance
$C_c$: 1950 pF typical stray capacitance
$C_d$: 0.1 pF typical gap capacitance FIG. 5 is an electrical diagram of an exemplary embodiment of a system 5000 of the present invention. System 5000 can include a target subsystem 5100 that is capacitively coupled to a sensing subsystem 5200, which can be electrically coupled to a processing subsystem 5300 and/or an information device 5400. Processing subsystem 5300 also can be connected to information device 5400, which can be connected via a network 5500 to another information device 5600, which can log information to a storage 5700, such as an archive or memory.

An embodiment of sensing subsystem 5200 can be any of systems 1000, 2000, 3000, and/or 4000. Sensing subsystem 5200 can sense gap, displacement, position, proximity, vibration, velocity, acceleration, jerk (the first derivative of acceleration with respect to time), pulse (the second derivative of acceleration with respect to time), and/or time (e.g., time of coupling, duration of coupling, time at which particular velocity occurs, time over which a acceleration occurs, etc.), etc.

Target 5100 can be any of a wide range of devices, including a machine having a rotating shaft or reciprocating component, a servo-positioner, and/or a magnetic bearing. Target 5100 also can be a vibrating structure such as, for example, structural steel in a building, a pipe in a power plant, a vehicle engine, etc.

Processing subsystem 5300 can process an output signal of sensing subsystem 5200 to determine an amplitude of a voltage of that signal. Upon receiving the output signal, processing subsystem 5300 can correlate the amplitude of that signal to, for example, to a measurement and/or determination (e.g., target is or is not capacitively coupled to sensor, target will likely be coupled in 100 microseconds, target is moving away from sensor, etc.) of gap, displacement, position, proximity, vibration, velocity, acceleration, jerk, and/or time, etc. Processing subsystem 5300 can store, communicate, and/or further process the amplitude, measurement, determination, and/or recognition. For example, processing subsystem 5300 can communicate an alert (e.g., sound an annunciator, send a paging message, and/or flash an alert box on a monitor, etc.) when a measurement exceeds a predetermined (e.g. minimum, maximum, threshold, etc.) value.

In one embodiment, processing subsystem 5300 can comprise a commercially available general-purpose microprocessor. In another embodiment, processing subsystem 5300 can comprise an Application Specific Integrated Circuit (ASIC) that has been designed to implement in its hardware and/or firmware at least a part of a method in accordance with an embodiment of the present invention. In yet another embodiment, processing subsystem 5300 can comprise a Field Programmable Gate Array (FPGA).

Processing subsystem 5300 also can comprise a memory comprising instructions that can be embodied in software, which can take any of numerous forms that are well known in the art. Processing subsystem 5300 also can include a communications interface, such as a bus, a connector, a telephone line interface, a wireless network interface, a cellular network interface, a local area network interface, a broadband cable interface, etc. Processing subsystem 5300 can be implemented in any of a wide range of configurations, such as, for example, integrated with sensing subsystem 5200, as a stand-alone device (such as a personal computer or the like), as a subsystem (e.g. plug-in card) of a personal computer or the like, etc.

Network 5500 can be a public switched telephone network (PSTN), a private network, a wireless network, a cellular network, a local area network, the Internet, etc.

Information devices 5400, 5600 also can comprise a microprocessor, a memory, instructions, and/or a communications interface. Information devices 5400, 5600 can be embodied in any of wide range of devices, such as a traditional telephone, telephonic device, cellular telephone, mobile terminal, Bluetooth device, communicator, pager, facsimile, computer terminal, personal computer, etc. Information devices 5400, 5600 can be used to program, interact with, and/or monitor sensing subsystem 5200 and/or processing subsystem 5300.

Figure 6:
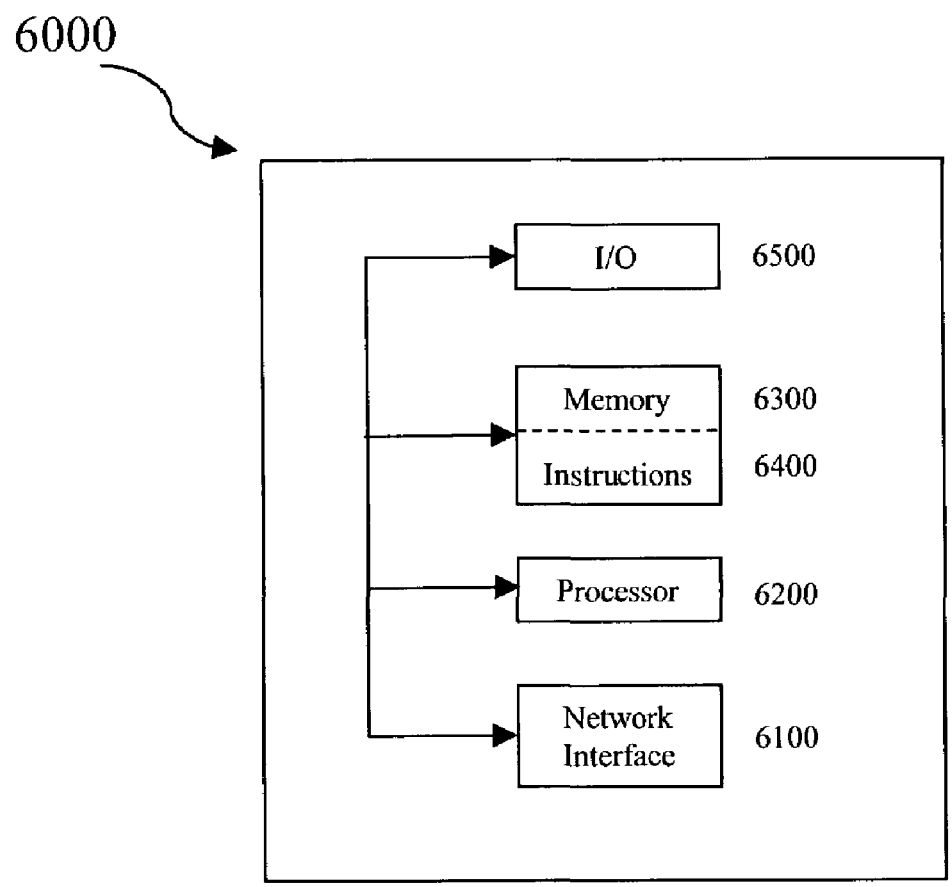
FIG. 6 is a block diagram of an exemplary embodiment of an information device 6000 of the present invention.

FIG. 6 is a block diagram of an exemplary embodiment of an information device 6000 of the present invention. Information device 6000 can represent any of information devices 5400, 5600, or even processing subsystem 5300. Information device 6000 can include well-known components such as one or more communication interfaces 6100, one or more processors 6200, one or more memories 6300 containing instructions 6400, and/or one or more input/output (I/O) devices 6500, etc.

In one embodiment, communication interface 6100 can be a bus, a connector, a telephone line interface, a wireless network interface, a cellular network interface, a local area network interface, a broadband cable interface, a telephone, a cellular phone, a cellular modem, a telephone data modem, a fax modem, a wireless transceiver, an Ethernet card, a cable modem, a digital subscriber line interface, a bridge, a hub, a router, or other similar device.

Each processor 6200 can be a commercially available general-purpose microprocessor. In another embodiment, the processor can be an Application Specific Integrated Circuit (ASIC) or a Field Programmable Gate Array (FPGA) that has been designed to implement in its hardware and/or firmware at least a part of a method in accordance with an embodiment of the present invention.

Memory 6300 can be coupled to processor 6200 and can comprise any device capable of storing analog or digital information, such as a hard disk, Random Access Memory (RAM), Read Only Memory (ROM), flash memory, a compact disk, a digital versatile disk (DVD), a magnetic tape, a floppy disk, and any combination thereof. Memory 6300 can also comprise a database, an archive, and/or any stored data and/or instructions. For example, memory 6300 can store instructions 6400 adapted to be executed by processor 6200 according to one or more activities of a method of the present invention.

Instructions 6400 can be embodied in software, which can take any of numerous forms that are well known in the art. Instructions 6400 can control operation of information device 6000 and/or one or more other devices, systems, or subsystems.

Input/output (I/O) device 6500 can be an audio and/or visual device, including, for example, a monitor, display, keyboard, keypad, touchpad, pointing device, microphone, speaker, video camera, camera, scanner, and/or printer, including a port to which an I/O device can be attached, connected, and/or coupled.

Figure 7:
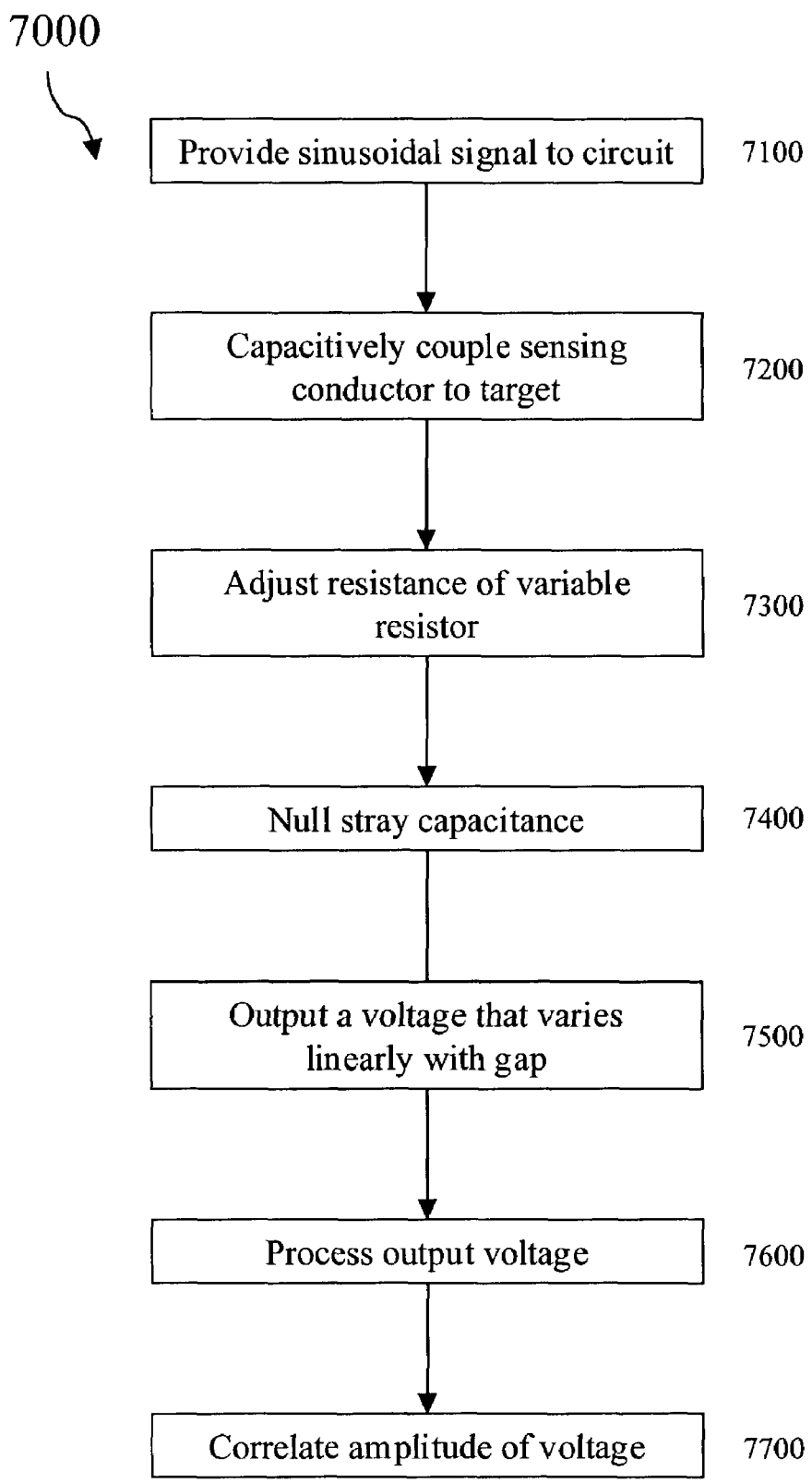
FIG. 7 is a flow diagram of an exemplary embodiment of a method 7000 of the present invention.

FIG. 7 is a flow diagram of an exemplary embodiment of a method 7000 of the present invention. At activity 7100, a sinusoidal signal can be applied to the capacitive sensing circuit. At activity 7200, a target can be capacitively coupled to a sensor conductor across a gap. At activity 7300, a variable resistor of the circuit can be adjusted such that the resonant frequency of the system $f_n$ matches that of the oscillator frequency $f_{osc}$. At activity 7400, one or more stray capacitances can be nulled, such as by adjusting a second variable resistor. At activity 7500, the circuit can output a voltage that varies linearly with the gap. At activity 7600, the output voltage can be processed. At activity 7700, an amplitude of the voltage can be correlated, such as, for example, to a measurement and/or determination of gap, displacement, position, proximity, vibration, velocity, acceleration, jerk, and/or time, etc.

The following reference is incorporated herein by reference in its entirety: Baxter, Larry K., Capacitive Sensors, Design and Applications, 1997, IEEE, New York.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A system, comprising a delay element connected to an op-amp, said delay element comprising:
    a stray capacitance $C_s$ between a guard conductor and a sensing conductor;
    a stray capacitance $C_c$ between the guard conductor and a grounded shield;
    an input resistance $R_d$ connected serially between an oscillating voltage input and said op-amp; and
    a first variable resistance $R_c$ connected in series between an output of said op-amp and the guard conductor;
    a resonant frequency of said system approximately equal to a frequency $f_{osc}$ of the oscillating voltage input.

2. The system of claim 1, the sensing conductor capacitively coupleable to a grounded target.

3. The system of claim 1, the sensing conductor coupleable to a grounded target by a gap capacitance $C_d$.

4. The system of claim 1, the sensing conductor capacitively coupleable to a grounded target, the grounded target separated from the sensing conductor by a gap having a width.

5. The system of claim 1, wherein the guard conductor surrounds the sensing conductor.

6. The system of claim 1, wherein a grounded shield surrounds the guard.

7. The system of claim 1, the sensing conductor coupleable to a grounded target by a gap capacitance $C_d$, wherein the guard conductor surrounds the sensing conductor and a grounded shield surrounds the guard.

8. The system of claim 1, further comprising a buffer amplifier between an output of said op-amp, and a power input of said op-amp.

9. The system of claim 1, further comprising a means for reducing parasitic capacitance between non-inverting input of said op-amp and a positive and negative power input of said op-amp.

10. The system of claim 1, further comprising a second variable resistance connected to an output of said op-amp.

11. The system of claim 1, wherein said op-amp is configured to provide a non-inverting gain.

12. The system of claim 1, further comprising a means for providing a non-inverting gain from said op-amp.

13. The system of claim 1, the sensing conductor coupleable to a grounded target by a gap capacitance $C_d$, the grounded target separated from the sensing conductor by a gap having a width, an output signal of said system having an output voltage varying linearly with the width of the gap when an impedance of the gap capacitance $1/(2\pi f_{osc} C_d)$ approaches or exceeds a resistance of said input resistor $R_d$.

14. The system of claim 1, further comprising a means for obtaining a measurement based on an output signal of said system.

15. The system of claim 1, further comprising a means for making a determination based on an output signal of said system.

16. The system of claim 1, further comprising a means for measuring a width of a gap between the grounded target and the sensing conductor based on an output signal of said system.

17. The system of claim 1, further comprising a means for measuring displacement based on an output signal of said system.

18. The system of claim 1, further comprising a means for measuring vibration based on an output signal of said system.

19. A system, comprising:
- a stray capacitance $C_s$ arising between a guard conductor and a sensing conductor;
- a stray capacitance $C_c$ arising between the guard conductor and a grounded shield;
- an input resistance $R_d$ connected serially between an oscillating voltage source and a non-inverting input of an op-amp; and
- a variable resistance $R_c$ connected in series between an output of the op-amp and the guard conductor;
- wherein the sensing conductor is connected to the non-inverting input of the op-amp, and a resonant frequency of said system is approximately equal to a frequency $f_{osc}$ of the oscillating voltage input.

* * * * *